July 21, 1964 R. C. HOKE ETAL 3,141,748
HYDROGEN PURIFICATION PROCESS
Filed Nov. 20, 1961 4 Sheets-Sheet 2

Ronald C. Hoke
William D. Marsh
Jerome Bernstein
Francis S. Pramuk
INVENTORS

BY Richard N. Nagel
PATENT ATTORNEY

Ronald C. Hoke
William D. Marsh
Jerome Bernstein
Francis S. Pramuk

INVENTORS

Ronald C. Hoke
William D. Marsh
Jerome Bernstein
Francis S. Pramuk

INVENTORS

United States Patent Office 3,141,748
Patented July 21, 1964

3,141,748
HYDROGEN PURIFICATION PROCESS
Ronald C. Hoke, Berkeley Heights, William D. Marsh, Netcong, Jerome Bernstein, Berkeley Heights, and Francis S. Pramuk, Fanwood, N.J., assignors to Esso Research and Engineering Company, a corporation of Delaware
Filed Nov. 20, 1961, Ser. No. 153,632
12 Claims. (Cl. 55—25)

The present invention relates to a method for separating hydrogen from hydrocarbon compounds. More specifically the present invention is concerned with a method wherein substantially pure hydrogen is recovered from a vapor stream comprising hydrogen and a mixture of hydrocarbon compounds. In its most specific aspects the present invention is concerned with a method wherein hydrogen of 99.0+ mol percent purity is recovered in exceptionally good yields from a vapor stream comprising hydrogen and a mixture of hydrocarbon compounds having from 1 to 10 carbon atoms such as the recycle gas stream in a catalytic reforming unit.

It is known to the art to fractionate gaseous mixtures using the technique of high pressure adsorption and low pressure desorption. It is thus an object of the present invention to provide an improved method whereby substantially pure hydrogen is efficiently fractionated from a vapor mixed hydrogen-hydrocarbon stream using the technique of high pressure adsorption and low pressure desorption.

It is a further object of the present invention to provide an improved method whereby substantially pure hydrogen is obtained for use in treating the catalyst in a catalytic reforming process.

The present invention contemplates using the techniques of heatless fractionation to separate hydrogen from a mixed hydrogen-hydrocarbon stream. To do this an adsorbent which has a higher affinity for hydrocarbon compounds than for hydrogen, is selected.

This process utilizes two zones packed with adsorbent so that at any instant in time one zone is on the adsorption portion of the cycle, and the other is on the desorption portion of the cycle. A complete cycle consists of the adsorption and desorption of one zone. The feed stream which comprises approximately 55 mol percent hydrogen, about 45 mol percent $C_1$ to $C_5$ hydrocarbons and trace amounts of $C_{5+}$ hydrocarbons, is passed through the zone which is on the adsorption portion of the cycle. The feed stream is passed through this zone until hydrocarbon compounds begin to break through into the effluent stream.

In the adsorption mechanism, the adsorption of hydrocarbon compounds occurs across a very narrow band in the adsorbent bed. This band, however, moves down the length of the bed in the same direction as feed flow. By stopping the flow of feed before breakthrough, the heat of adsorption remains in the bed and is available when the hydrocarbon compounds are desorbed.

While the one adsorbent bed is being used to process the feed stream, the previously adsorbed hydrocarbon compounds are being desorbed from the other bed. This bed is thus on the desorption portion of the cycle.

The desorption step consists of reducing the pressure on the feed inlet end of the bed, introducing a portion of the product at the outlet end, thus backwashing the adsorbent to remove the compounds adsorbed during the adsorption step, and repressuring the bed to adsorption pressure with a portion of the product.

The cycle time periods are relatively short, and, therefore, the adsorbent beds are relatively small. The quantity of adsorbent in each bed depends on the feed rate and the cycle length. As the feed rate is increased, the quantity of adsorbent is increased so as to adsorb the additional hydrocarbon compounds. As the cycle length is increased, the quantity of feed per cycle increases, and the quantity of adsorbent required increases.

The shape of the adsorbent bed is governed by conditions known to retard channeling. Thus, channeling should be kept at a minimum so as to obtain the maximum use of all the adsorbent.

While this process of heatless fractionation has been found to be extremely efficient, numerous difficulties have been encountered in adapting it to the process of separating hydrogen from a stream containing hydrogen, $C_1$ to $C_5$ hydrocarbon compounds and trace amounts of $C_{5+}$ hydrocarbon compounds.

In a heatless fractionation process for the separation of hydrogen from a stream containing hydrogen and hydrocarbon compounds an adsorbent is chosen which has a higher affinity for the hydrocarbon compounds than it has for hydrogen. Thus, when the feed stream is passed through the adsorbent bed the hydrocarbon compounds are selectively adsorbed to a greater degree than hydrogen. However, when using those adsorbents which give a favorable separation between hydrogen and hydrocarbon compounds, the heavier hydrocarbon compounds, especially, become extremely difficult to desorb from the adsorbent. It may be noted that the ease with which a given hydrocarbon compound is desorbed from the adsorbent is related, to some extent, to its molecular weight. Thus, the heavier the hydrocarbon compound, the more difficult it is to desorb from the adsorbent.

In the desorption portion of the cycle, then, the adsorbent bed is depressured and purged with a portion of the product. During the purge, in which the adsorbent bed is backwashed with product, some of the adsorbed hydrocarbon compounds are removed from the adsorbent and carried out of the bed. However, the heavy hydrocarbon compounds remain on the adsorbent. As the unit continues on stream, there is a gradual buildup of the heavy hydrocarbon compound on the adsorbent. As a result, there is a corresponding decrease in the capacity of the adsorbent. This effect may be seen in FIGURE 3 wherein the percent of initial intrinsic capacity of the adsorbent is plotted against the total quantity of hydrocarbons passed through the adsorbent. The capacity of the adsorbent declines rapidly at first, but then tends to level off somewhat. Therefore, it is an object of the present invention to provide a heatless fractionation process wherein 99.0+ mol percent hydrogen is obtained with exceptional recoveries even though the capacity of the adsorbent becomes impaired by the adsorption of the heavy components in the feed stream.

It is a further object of the present invention to provide a means whereby the capacity of the absorbent is periodically increased to a level equivalent to that of fresh adsorbent.

Additionally, it is an object of the present invention to provide a process whereby the maximum amount of hydrogen is recovered from the feedstream as the capacity of the adsorbent declines.

Another object of the present invention is to provide a means whereby the maximum benefit of the purge of the adsorbent bed is obtained.

It is also an object of the present invention to provide a process wherein substantially pure hydrogen is obtained at a substantially constant rate even though the adsorbent experiences an adsorption capacity loss.

These and other objects of the present invention will become apparent when viewed in light of the accompanying drawings.

Figure 1:
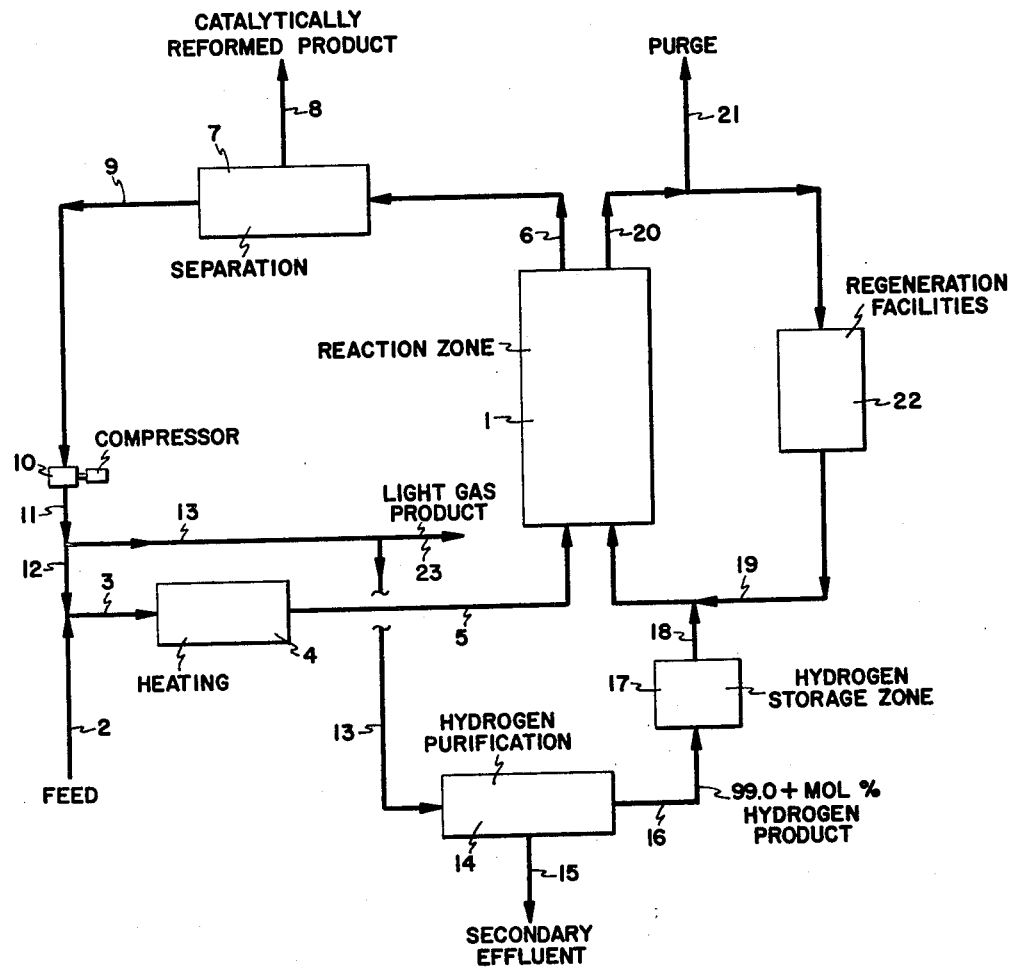
FIGURE 1 is a flowplan of a catalytic reforming process wherein the present invention is embodied to obtain a substantially pure hydrogen stream which is used in treating the catalyst.

In FIGURE 1, numeral 1 designates the reaction zone in a catalytic reforming unit. The catalyst used in a catalytic reforming operation is usually 0.03 to 2 wt. percent platinum dispersed on an alumina base. Chlorine is also normally on the catalyst either as a complex or in the chemisorbed state. Numeral 2 designates the line through which the feed stream is introduced to the catalytic reforming unit. The feed is a hydrocarbon stream which boils in the range of from $C_4$ to 450° F.

The feed, line 2, is mixed with the recycle gas, line 12, and is passed through line line 3 into heating means 4. The recycle gas, the composition of which will be discussed in detail hereafter, is normally a hydrogen-hydrocarbon mixture. It contains hydrogen, $C_1$–$C_5$ hydrocarbon compounds, and a small amount of $C_{5+}$ hydrocarbons.

In heating means 4, the temperature of the recycle gas-hydrocarbon feed mixture is raised to reaction temperature which is in the range of from 800° to 1050° F. Heating means 4 is a furnace and/or a heat exchange train or other similar heating devices known to the art. The effluent from heating means 4 passes through line 5 to reaction zone 1 where the quality of the hydrocarbon feed is upgraded by contact with catalyst previously described. The reaction pressure is 50 to 1000 p.s.i.a. while the feed rate is from 0.1 to 10 v./v./hr. and the hydrogen partial pressure is in the range of 40 to 500 p.s.i.a. In reaction zone 1, numerous reactions occur including: dehydrogenation of naphthenes, dehydrocyclization of paraffins, cracking of paraffins and isomerization of paraffins. All these reactions tend to increase the octane number of the $C_{5+}$ hydrocarbon fraction.

The effluent from reaction zone 1 passes through line 6 to separation means 7 wherein the catalytically reformed hydrocarbon fraction is segregated and taken off in line 8 as the upgraded product. This stream is further separated into a $C_{5+}$ gasoline fraction and liquefied petroleum gas by any suitable means, such as, fractional distillation. Separation means 7 may be any fractional distillation means known to the art capable of performing the desired separation. Hydrogen and the light hydrocarbon fraction are passed through line 9 to compressor 10 wherein the gas is compressed to a pressure slightly above reaction pressure. The effluent from compressor 10 passed through line 11 where it is segregated into a recycle gas sream, line 12, and a make gas stream, line 13, part of which is fed to the hydrogen purification unit 14. The remaining make gas goes through line 23 for other refinery uses and may be disposed of by any suitable means. The hydrogen purification unit 14, which is the subject of the present invention, will be described in detail later.

In the hydrogen purification unit 14, the make gas stream, line 13, which contains hydrogen and light hydrocarbons, is separated into a 99.0+ mol percent hydrogen stream which is the hydrogen product, line 16, and a secondary effluent, line 15, which contains hydrogen and light hydrocarbons. This material is sent to the refinery fuel and gas recovery system. The hydrogen product, line 16, is passed to hydrogen storage zone 17 where it awaits being used during regeneration of reaction zone 1.

As reaction zone 1 continues on stream, there is a gradual buildup of coke on the catalyst which tends to reduce the effectiveness of the catalyst in the conversion of the hydrocarbon feed to a high octane product. Therefore, the catalyst in reaction zone 1 is periodically regenerated so as to return it to a state wherein it is substantially equivalent to fresh catalyst.

Reaction zone 1 may be either, what is known to the art as, a semi-regenerative or a cyclic catalytic reformer. In the semi-regenerative catalytic reformer the reaction zone is periodically shut down and the catalyst therein is regenerated. In this event hydrogen storage zone 17 is required in order to have pure hydrogen available for the regeneration sequence.

In a cyclic catalytic reformer, reaction zone 1 remains on stream continuously. This continuous operation is attained by using a swing reactor. The swing reactor serves to replace a reactor wherein the catalyst has become ineffective due to coke buildup on the catalyst. This reactor containing spent catalyst is then regenerated and returned to reaction zone 1.

Thus, in a cyclic catalytic reformer hydrogen storage zone 17 can be omitted since the catalytic reformer continuously produces hydrogen. However, it is preferred to include hydrogen storage zone 17 with a cyclic catalytic reformer so that the size of the hydrogen purification unit 14 can be kept at a minimum.

Reaction zone 1 is regenerated in several steps. In the first step the carbon on the catalyst is burned. This is done by passing an inert gas with a limited quantity of oxygen through the catalyst bed. The inert gas with a small amount of oxygen emanates from regeneration facilities 22 through line 19 to reaction zone 1. The amount of oxygen in the inert gas is limited to prevent overheating of the catalyst bed in the carbon burning process. The maximum temperature is preferably in the range of 950° to 1050° F.

The effluent gases from the reactor pass through line 20 back to regeneration facilities 22 where a small amount of oxygen is bled into the recycling gas stream. A small amount of the gas in this loop is purged through line 21 to keep the loop from being overpressured from the products of combustion.

After the burning is complete, the oxygen content of recycling inert gas stream is increased to 5 to 10 mol percent to insure removal of carbon from the catalyst. The maximum temperature is in the range of 950° to 1050° F.

Since the catalyst is contacted with an oxygen-containing gas, oxygen is chemisorbed on the catalyst. Also, reactor scale is oxidized during the carbon burn. Therefore, to bring feed into the reactor without first reducing the oxides would bring about the formation of a considerable amount of water in the reaction zone. The presence of water in the reaction zone is detrimental to the reforming process. It can result in a $C_{5+}$ product yield loss of 0.5 to 4.0 vol percent. Therefore, the catalyst is treated with pure hydrogen from storage zone 17 to reduce the oxides in the reaction zone. Hydrogen passes from hydrogen storage zone 17 through lines 18 and 19 to reaction zone 1. It then leaves through line 20 and is purged through line 21 or it may be dried and recirculated in the regeneration loop.

Figure 2:
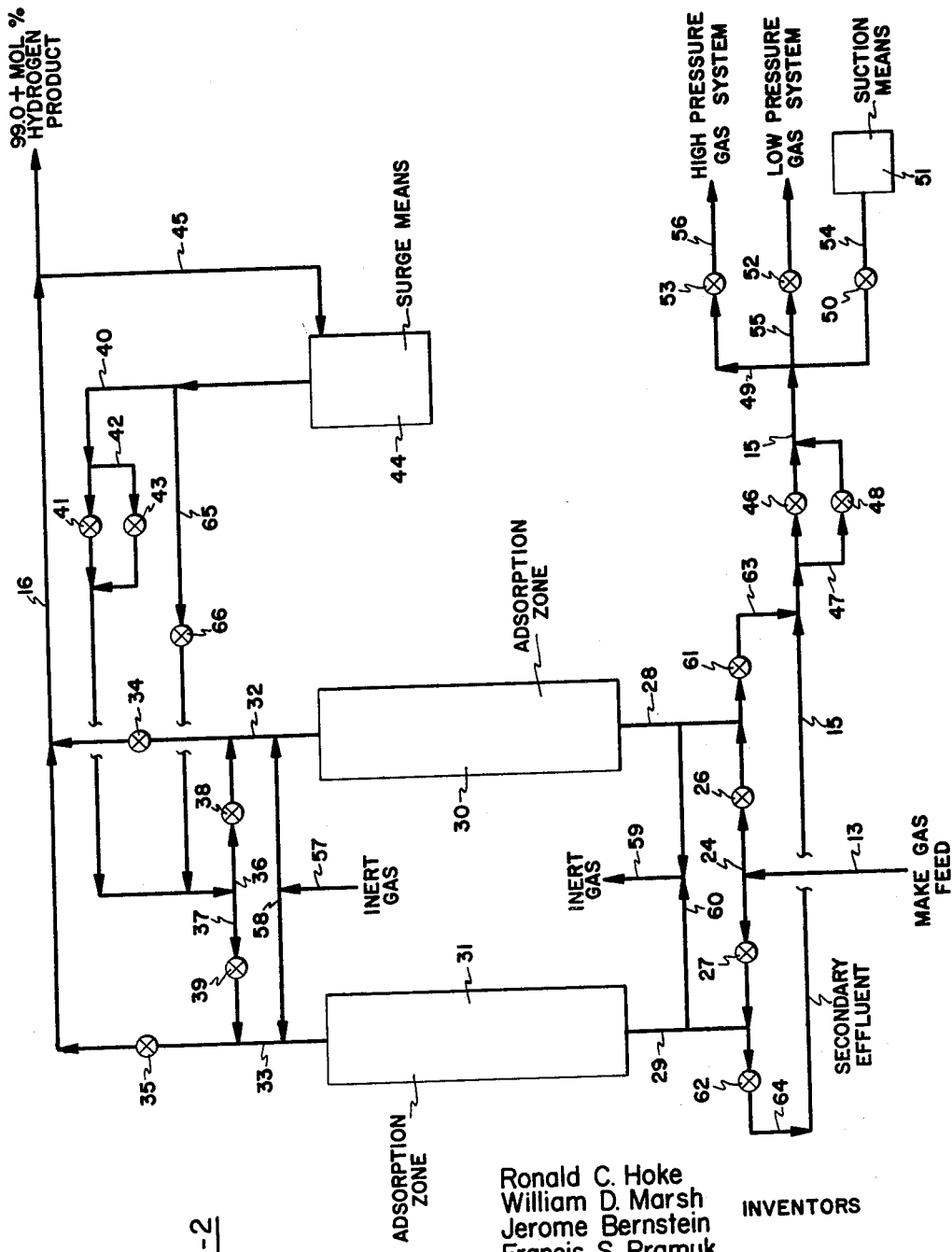
FIGURE 2 is a flowplan illustrating the process of the present invention.

FIGURE 2 depicts the flow plan of the hydrogen purification zone 14 (of FIGURE 1) wherein lies the process of the present invention.

The feed which is the make gas from the catalytic reformer, line 13, is a hydrogen-hydrocarbon mixture. The hydrogen content of this stream is from 35 to 85 mol percent hydrogen. This gas stream also contains $C_1$ to $C_5$ hydrocarbons with trace quantities of hydrocarbons which boil above $C_5$. A typical composition is shown in Table I:

TABLE I

| Component: | Mol percent |
|---|---|
| $H_2$ | 54.6 |
| $C_1$ | 19.9 |
| $C_2$ | 13.4 |
| $C_3$ | 7.1 |
| $C_4$ | 3.5 |
| $C_5$ | 1.5 |
| | 100.0 |

The make gas feed passes through line 13, header 24, valve 26, line 28, and into zone 30. Zones 30 and 31 are packed with an adsorbent which is selective for hydrocarbon compounds. Examples of such adsorbent are activated charcoal and activated alumina. The preferred adsorbent is activated charcoal. Thus, as the hydrogen-hydrocarbon stream passes through zone 30, the hydrocarbon compounds are selectively adsorbed and a 99.0+ mol percent hydrogen effluent stream leaves zone 30 and passes into line 32. In this description, zone 30 is on the adsorption portion of the cycle while zone 31 is on the desorption portion of the cycle.

The adsorption step is carried out at a temperature in the range of from 50° to 200° F. However, adsorption temperatures in the range of 75° to 150° F. are preferred. Adsorption pressures are in the range of from 0 to 700 p.s.i.g., while the preferred adsorption pressures are in the range of from 200 to 650 p.s.i.g. It should be noted the adsorption temperature affects the quantity of adsorbent required. In general, as the adsorption temperature is decreased, the quantity of adsorbent required to process the feed stream at a given rate also decreases. However, in the hydrogen purification process, which is the process of the present invention, countervailing considerations are present.

As it has been previously noted, the capacity of the adsorbent tends to decline due to the accumulation of $C_5+$ hydrogen compounds thereon. However, another consideration has been found wherein the capacity decline of the adsorbent is less at higher adsorption temperatures. For instance, operating at an adsorption temperature level of 150° F. results in approximately a 39% higher capacity after the equivalent of a month's operation than the same operation at 100° F. adsorption temperature. The reduction in the feed rate to the adsorption zone is only 10 to 15% as a result of the higher adsorption temperature. This effect becomes important when viewed in light of the fact that the quantity of adsorbent required rests, to some extent, on the rate at which the capacity of the adsorbent declines. Thus, the preferred adsorption temperature is in the range of from 75° to 150° F.

Returning to FIGURE 2, the 99.0+ mol percent hydrogen effluent stream passes through valve 34 in line 32 to line 16 where it may be sent to storage or directly to the catalytic reformer. A portion of the 99.0+ mol percent hydrogen effluent in line 16 passes through line 45 to surge means 44. Surge means 44 is a drum or other means known to the art capable of retaining hydrogen for use in the desorption of zone 31. The function of surge means 44 is to provide a reservoir of hydrogen for desorption. This serves to reduce the amplitude of the fluctuations in the feed rate to the unit.

It is to be noted that one of the objects of the present invention is to provide a process wherein substantially pure hydrogen is produced at a substantially constant rate. Through the use of surge means 44, a reservoir of hydrogen is maintained for purging and repressuring the zone on the desorption portion of the cycle. Thus, the hydrogen product rate is maintained at a constant value by a flow rate controller or other suitable means. The hydrogen used to purge and repressure the zone on the desorption portion of the cycle is drawn from surge means 44.

The feed rate to the hydrogen purification unit varies within the cycle as hydrogen is being used to purge and repressure the zone on the desorption portion of the cycle. Thus, it may be visualized that the feed rate is at its lowest when the zone on the desorption portion of the cycle is being depressured and thus, essentially all the hydrogen produced is being taken off as product. During purging and repressuring, hydrogen is being used over and above that being taken off as product. Therefore, the feed rate to the zone on the adsorption portion of the cycle reaches a maximum during these phases of the cycle. By using surge means 44, these variations in feed rate can be cushioned, to some extent, by increasing the holdup of hydrogen within the system. Sudden variations in feed rate to the zone on the adsorption portion of the cycle are sought to be avoided since they appear to cause an upset in the hydrocarbon concentration gradient in the adsorption zone. Surge means 44 is thus utilized to reduce the sudden violence of surges in the feed rate to the zone on the adsorption portion of the cycle. Surge means 44 is sized in accordance with methods known to the art keeping in mind that its function is to provide an internal holdup of hydrogen to cushion the variation in the demand for substantially pure hydrogen.

It should be noted that as thus described, the make gas feedstream flows into zone 30 and substantially pure hydrogen is taken from it. The valves that are open, thereby permitting flow in the manner indicated, have been described. It is, therefore, assumed that certain other valves will be closed so as to allow flow in the manner described. Thus, when valve 26 is open, valve 27 is closed. Similarly, when valve 34 is open, valves 35 and 38 are closed.

While zone 30 is on the adsorption part of the cycle, zone 31 is on the desorption part of the cycle. Thus it is a cyclic process wherein one zone is on the adsorption part of the cycle while the other zone is on the desorption part of the cycle. One zone is therefore available to process the feedstream.

The desorption is carried out in the following manner. With zone 31 at the adsorption pressure, and with valves 39, 35 and 27 closed, valves 62, 48 and 53 are opened. The desorbate, or secondary effluent, then passes from zone 31 through line 29, header 24, through valve 62, into line 64, line 15, line 47, valve 48, and back to line 15, into header 49, line 56, and through valve 53.

As shown in FIGURE 2, header 49 opens into lines 54, 55 and 56. This is a preferred embodiment of the present invention wherein valve 53 opens first, allowing a portion of the depressuring gases to pass into a high pressure fuel gas system. Then, when the pressure in adsorption zone 31 reaches the level of the pressure in the high pressure fuel gas system, valve 53 closes and valve 52 opens, allowing the depressuring gases to pass into line 55, through valve 52, and into a low pressure fuel gas system. When this low pressure level is reached in adsorption zone 31, valve 50 opens and valve 52 closes, thereby connecting adsorption zone 31 to suction means 51. Suction means 51 is a steam jet ejector or other suitable means capable of reducing the pressure in adsorption zone 31 to a level substantially below atmospheric pressure.

While it is not imperative that the depressuring gases from adsorption zone 31 be dumped in exactly the manner previously described, it does give rise to the maximum recovery of the secondary effluent and, thus, is the preferred method of disposing of these depressuring gases.

A pressure switching means is utilized to direct the path of the depressuring gases first through valve 53, then through valve 52, and finally through valve 50 into suction means 51. When the pressure in the adsorption zone is above 100 p.s.i.g., valve 53 is open and valves 52 and 50 are closed. Between 100 p.s.i.g. and 2 p.s.i.g. valve 52 is open and valves 53 and 50 are closed. Below 2 p.s.i.g. valve 50 is open to evacuate adsorption zone 31 while valves 53 and 52 are closed.

The pressure switching means used to operate the valves, as described above, is any suitable means known to the art, either electric or pneumatic, capable of actuating the valve operators when the pressure in the adsorption zones reaches a predetermined level.

When zone 31 is first depressured, valve 46 is closed and valve 48 is open. Valve 48 is set so as to give a predetermined restriction to the depressuring gas as it flows from zone 31 out through line 15. It has been found that depressuring too rapidly causes undue attrition of the adsorbent. Thus, the initial stages of the depressuring are controlled. However, there are desirable effects associated with a rapid depressuring of the adsorbent. The data in Table II show how the product hydrogen recovery is increased as the time required to depressure the adsorption zone is decreased.

On the other hand, it may be noted that attrited adsorbent is extremely fine and very difficult to retain in the adsorption zone. As a result, attrited adsorbent is almost immediately blown out of the zone. Adsorbent attrition can thus account for a considerable diminution of the quantity of adsorbent over a period of time and also cause severe valve wear.

Therefore, in order to reap the benefits of the rapid depressuring while at the same time keeping attrition of the adsorbent as low as possible, a two-stage depressuring means is used.

TABLE II

*Effect of Depressuring Time*

| Depressuring time (sec.): | $H_2$ recovery (percent of $H_2$ in feed) |
|---|---|
| 40 | 33.2 |
| 60 | 31.8 |

Conditions:
- Feed composition, mol percent _____ 50% $H_2$, 50% $C_1$-$C_3$.
- Adsorption pressure _____ 550 p.s.i.g.
- Adsorption temperature _____ 100° F.
- Vol. of purge per vol. of feed _____ 1.0.
- Depressuring pressure _____ 10 p.s.i.a.
- Product composition _____ 99.0+ mol percent $H_2$.
- Adsorbent _____ Activated carbon.

TABLE III

*Effect of Depressuring Pressure*

| Depressuring pressure (p.s.i.g.): | $H_2$ recovery (percent of $H_2$ in feed) |
|---|---|
| 5 | 28.4 |
| 15 | 20.4 |

Conditions:
- Feed composition, mol percent _____ 50% $H_2$, 25% $C_1$, 13% $C_2$ and 12% $C_3$.
- Adsorption pressure _____ 550 p.s.i.g.
- Adsorption temperature _____ 100° F.
- Vol. of purge per vol. of feed _____ 1.0.
- Depressuring time _____ 30 sec.
- Product composition _____ 99.0+ mol percent $H_2$.
- Adsorbent _____ Activated carbon.

When zone 31 goes on the desorption portion of the cycle, a variable cycle timer (not shown), the use of which will be described hereafter, opens valve 62 to commence depressuring through the preset restriction in valve 48. At a preset time in the cycle, valve 46 opens and the restriction to flow is removed. Zone 31 is then rapidly depressured.

Through the use of a two-stage depressuring of the absorbent in zone 31, one of the objects of the present invention is accomplished. As the data of Table II show, a considerable advantage in hydrogen recovery is obtained by depressuring the adsorbent zone 31 as rapidly as possible. The present invention contemplates a method whereby the maximum benefit accompanying rapid adsorbent depressuring is obtained with substantially no adsorbent attrition.

The data in Table III show the effect of depressuring pressure on the hydrogen recovery from the feed stream. From these data it may be seen that as the pressure to which the bed is depressured is decreased the amount of pure hydrogen product recovered from the feed stream is increased.

Therefore, it is also within the scope of the present invention to use suction means 51 to evacuate zone 31 to the lowest pressure possible. A steam jet ejector is satisfactory for this purpose. Pressures as low as 2 p.s.i.a. are used to desorb zone 31 to the fullest extent.

After the pressure in zone 31 is reduced to a predetermined level, in the range of from 2 to 15 p.s.i.a., a pressure in the range of from 8 to 12 p.s.i.a. is preferred, valves 39 and 66 are opened to allow pure hydrogen product to flow from surge means 44 through line 40, line 65, valve 66, back to line 40 into line 37, through valve 39, line 33 and into the top of zone 31. The purge gases are then passed from the system through the depressuring circuit into suction means 51 as described above. Again, it is desired to purge zone 31 at as low a pressure as is feasible to obtain the maximum volume of purge. Therefore, the purge gas will backwash zone 31 through lines 29, 24, valve 62, line 64, valve 46 in line 15, header 49, line 54, valve 50 and out through suction means 51 where the purge gas is disposed of by any suitable means. The pressure maintained at suction means 51 during the purge step is in the range of from 2 to 15 p.s.i.a. However, it is preferred to maintain a pressure in the range of from 8 to 12 p.s.i.a.

The rate of purge of zone 31 with pure hydrogen product is controlled by valve 66 in line 65. The purge rate also, is controlled to avoid adsorbent attrition in zone 31.

Figure 4:
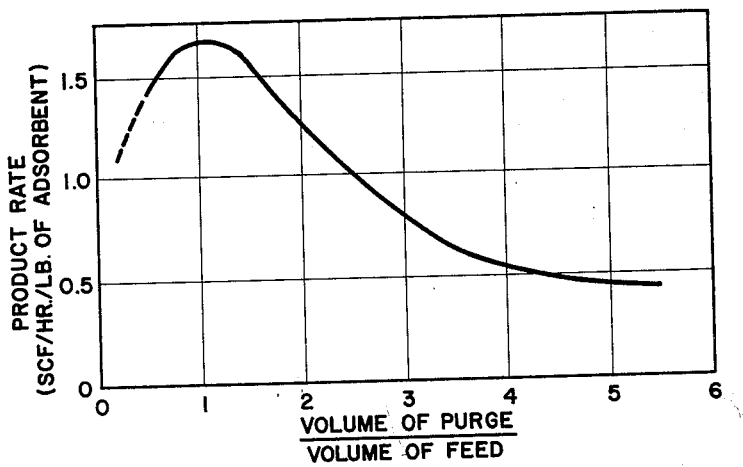
FIGURE 4 illustrates graphically the optimum volume of purge used in desorbing the adsorbent bed substantially saturated with hydrocarbon compounds.

FIGURE 4 graphically illustrates that the optimum purge to feed ratio, on a volume basis, is about 1.0. In FIGURE 4, the hydrogen product rate (standard cubic feet per hour per pound of adsorbent) is plotted against the ratio of the volume of purge passed through the adsorbent bed per cycle to the volume of feed passed through the bed per cycle. This shows that if the volume of purge at the low purge pressure is less than the volume of the feed passed through the bed at the high adsorption pressure, the capacity of the adsorbent to adsorb the hydrocarbon compounds in the feed is unduly diminished and the product rate per pound of adsorbent decreases. On the other hand, when high purge to feed ratios are used, good desorption of the hydrocarbons on the adsorbent is obtained. However, the increase in adsorbent capacity is overshadowed by the loss of hydrogen product used in purging the adsorbent. It should be noted that with a given purge rate, the volume of the purge is increased by decreasing the purge pressure. Therefore, a purge pressure and a purge rate are selected to yield the optimum conditions shown in FIGURE 4.

Therefore, the purge volume which will yield a purge to feed ratio, on a volume basis, in the range of from 0.5 to 1.5 is used. It is preferred that the purge to feed ratio be in the range of from 0.8 to 1.2.

The data in FIGURE 4 were obtained using activated carbon adsorbent, a feed having 40 mol percent hydrogen, an adsorption pressure of 500 p.s.i.g., an adsorption temperature of 90° F., a 10 p.s.i.a. desorption pressure and a 6 minute cycle length.

The final step before zone 31 is put on the adsorption portion of the cycle is the repressuring step. When the purge is complete the variable cycle timer closes valves 62, 50, 46 and 66, and opens valve 43. Pure hydrogen product flows from surge means 44 through line 40, line 42, valve 43, line 40, line 37, valve 39, and line 33 into zone 31 which is brought up to the pressure at which it is operated during the adsorption portion of the cycle.

In the preferred embodiment of the present invention, the repressuring of zone 31 is conducted in two steps. It is preferred to initially restrict the rate of repressuring when a large pressure difference exists between zone 31 and surge means 44 in order to minimize attrition of the adsorbent in zone 31 and limit the feed surge in zone 30. At the beginning of the repressuring step, pure hydrogen flows from surge means 44 through line 40, line 42, valve 43 and back to line 40 where it passes through line 37, valve 39, line 33 and into zone 31. When the pressure in zone 31 reaches a preselected level, valve 41 is opened thereby decreasing the pressure drop in the lines between surge means 44 and zone 31. Thus, an essentially constant flow rate of hydrogen is maintained throughout repressuring. Initially, when zone 31 is at a low pressure and surge means 44 is at high pressure, the pressure drop in the lines between the two is kept at a high level by restricting the flow with valve 43. As the pressure in zone 31 increases valve 41 is opened thereby removing the restriction to flow imposed by valve 43. Valve 41 is opened when the pressure in zone 31 reaches the range of from 200 to 450 p.s.i.a. The preferred range, however, is 250 to 350 p.s.i.a. The opening of valve 41 is controlled by the variable cycle timer.

After the repressuring step is complete, valves 39, 41 and 43 are closed. Zone 31 is then ready to be placed on the adsorption portion of the cycle. Zone 31 is switched to the adsorption portion of the cycle by opening valves 27 and 35. Zone 30 is then switched to the desorption portion of the cycle by closing valves 26 and 34. A substantial portion of the adsorbed hydrocarbon compounds in zone 30 are then desorbed in a manner similar to that set out previously for zone 31. As it has been previously mentioned, there is a gradual buildup of the more difficultly desorbable hydrocarbon compounds on the adsorbent.

Zone 30 can be put on the desorption portion of the cycle and zone 31 can be put on the desorption portion of the cycle any time after zone 31 has been desorbed as set out above. However, in the preferred embodiment of the present invention, the two zones are switched when hydrocarbon compounds break through into the hydrogen effluent from the zone on the adsorption portion of the cycle. Hydrocarbon breakthrough into the hydrogen effluent may be detected by any suitable means known to the art such as a thermal conductivity cell. Thus, the adsorption portion of the cycle will govern the cycle length. As an example, suppose the desorption portion of the cycle can be carried out in 3 minutes. Initially, the adsorption portion of the cycle is 15 minutes. The cycle length is 30 minutes. After the zone on the desorption portion of the cycle has been desorbed, as set out above, it will be idle for 12 minutes, until hydrocarbon breaks through into the effluent from the zone on the adsorption portion of the cycle.

As the adsorbent loses capacity, the cycle lengths decrease until the adsorption portion of the cycle is shorter than the desorption portion of the cycle. At this point the zones are regenerated in a manner hereafter described.

It should be noted that each zone 30 and 31 is on the adsorption portion of the cycle for a period of time ranging from 1 to 30 minutes, preferably from 3 to 10 minutes. Thus, the numerous valves which must be opened and closed to switch zone 31 to adsorption and zone 30 to desorption are all automatically operated by a cycle timer (not shown). Furthermore, the valve manipulations that are incurred as a result of the depressuring, purging and repressuring are also carried out automatically by the same cycle timer except for those valves which are operated by a pressure switching means as indicated above.

It may be noted that as described, the make gas feed stream is introduced into adsorption zones 30 and 31 through lines 28 and 29, respectively. Furthermore, during the desorption portion of the cycle these adsorption zones are also depressured and purged through these two lines.

It has been found that good distribution of the make gas feed in the adsorption zones is associated with a high pressure drop gas distribution nozzle. However, during depressuring and purging, it is desirable to have a low pressure drop through the adsorption zones.

Thus, it is within the scope of the present invention to utilize a high pressure drop distributor for the feed stream line, and to have a separate line to withdraw the depressuring and purging gases under substantially lower pressure drop conditions.

It is within the scope of one skilled in the art to provide the additional pipes and valves required for this feature. It may be done either with a coaxial distribution arrangement or by placing the two lines adjacent to one another.

In spite of the steps taken during the desorption portion of the cycle, as set out above, there is a continuous gradual decline in the capacity of the adsorbent to take up the hydrocarbon compounds during the adsorption portion of the cycle. This means that if initially the adsorption portion of the cycle is 10 minutes, thus giving an over-all cycle length of 20 minutes, there is a gradual decline in the capacity of the adsorbent until the adsorption portion of the cycle is 3 minutes, giving an over-all cycle length of 6 minutes. Therefore, in the preferred embodiment of the present invention a variable cycle timer is used to actuate the valves which switch zones 30 and 31 from adsorption to desorption and vice versa.

Figure 5:
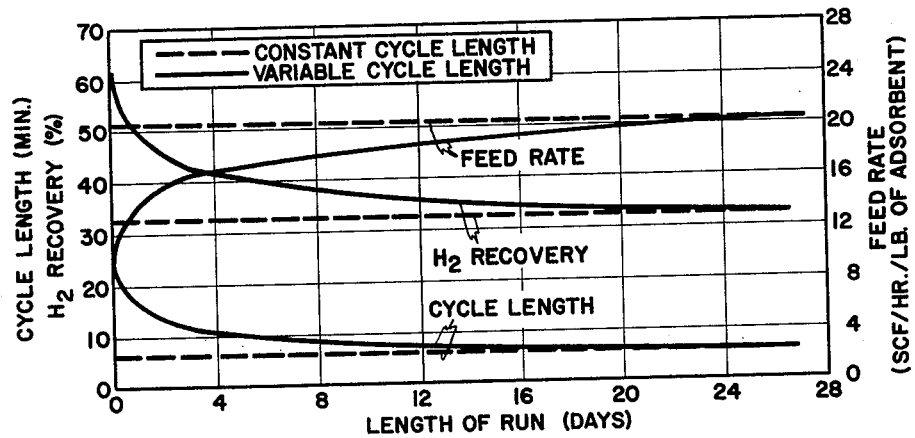
FIGURE 5 illustrates graphically the effect that variable cycle length has on the hydrogen recovery from the feed.

FIGURE 5 graphically illustrates the advantages in using a variable cycle length as the capacity of the adsorbent declines.

The cycle length, hydrogen recovery, and feed rate are all plotted against the number of days the hydrogen purification unit is on stream without being regenerated. These curves were obtained with the unit producing a constant rate of hydrogen product, with a feed having the composition set out in Table I, utilizing activated carbon adsorbent.

The lower set of curves labeled "Cycle Length" show the constant cycle length using the prior art heatless fractionation process and the variable cycle length of the process of the present invention.

It is assumed in the graph of FIGURE 5 that the adsorbent will be regenerated after 28 days. Thus, a constant cycle length is that cycle length obtainable at the end of the 28 day period.

The second set of curves labeled "H$_2$ Recovery," illustrates the increased hydrogen recovery using a variable cycle length as opposed to a constant cycle length. It may be seen that when a variable cycle length is employed the hydrogen recovery decreases from an initial 62% to about 32% after 28 days giving an average hydrogen recovery of about 40% for the entire period.

On the other hand, if the cycle lengths were held constant over the same period the hydrogen recovery would be only 32%. Thus, by employing a means to vary the cycle length, such as a variable cycle timer, a substantial increase in hydrogen recovery is obtained. The variable cycle timer is commercially available under the trade name of Flex-O-Timer, Model 242, or its equivalent.

The third set of curves labeled "Feed Rate" show the feed rate required in order to produce a constant hydrogen product rate.

With a constant cycle length, the hydrogen recovery is constant, and, therefore, the feed rate required to produce a given hydrogen product rate, is constant.

With the variable cycle length in the process of the present invention the feed rate is increased as the hydrogen recovery from the feed decreases. Thus, when the hydrogen recovery decreases to ⅔ of its initial value, the feed rate is increased to 3/2 of its initial value to maintain a given product rate. This relationship between the feed rate and hydrogen recovery to maintain a constant product rate, presupposes a set feed composition. If the percentage of hydrogen in the feed stream varies appreciably additional adjustments to the feed rate have to be made to maintain a constant product rate.

Figure 3:
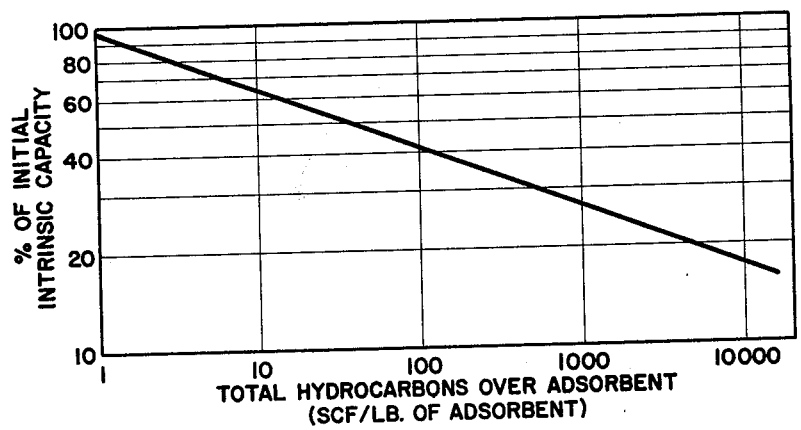
FIGURE 3 illustrates graphically the capacity decline of the adsorbent as a function of the total quantity of hydrocarbon compounds passed through the adsorbent bed.

Another object of the present invention is to provide a means whereby the adsorbent is periodically restored to its initially high capacity to adsorb hydrocarbon compounds. The capacity loss of the adsorbent is due to the presence of trace amounts of $C_5$ to $C_{10}$ hydrocarbon compounds in the vapor stream being processed. Even though these compounds are in the stream only in trace amounts they gradually build up on the adsorbent and reduce its capacity as shown in FIGURE 3. These $C_5$ to $C_{10}$ hydrocarbon compounds are not appreciably desorbed in the depressuring and purging operations described above.

FIGURE 3 graphically illustrates the percent capacity loss of the adsorbent as a function of the total quantity of hydrocarbons passed through the adsorption zone per pound of adsorbent in the zone. The adsorbent is activated carbon. The feed stream used in obtaining this plot was a gas stream of varying composition. The hydrogen content varied from 68 to 85 mol percent with the remainder being $C_1$ to $C_{10}$ hydrocarbons. The $C_5+$ content remained constant at about 0.6 mol percent. The adsorption pressure was 380 to 440 p.s.i.g. It should be noted that the capacity decline is an exponential function of the quantity of hydrocarbons passed through the adsorption zone and, therefore, tends to decline rapidly at first but tends to level off.

Suppose, for example, that a hydrogen-hydrocarbon stream is passed through the adsorbent bed at a given rate for 5 minutes before there is any hydrocarbon breakthrough in the hydrogen product effluent. Thus, the adsorption portion of the cycle is 5 minutes. As the capacity of the adsorbent diminishes, the period of time before hydrocarbon appears in the hydrogen product effluent also diminishes. This means that the time the bed is on the adsorption portion of the cycle is decreased. As a result, the desorptions of the adsorbent occur more frequently. This results in a decrease in the hydrogen recovery from the feed stream. If the capacity of the adsorbent is allowed to continue to decline, the result is that the cycle lengths become so short that there is insufficient time to desorb the adsorbent properly.

Thus, there are numerous factors that determine when the adsorbent should be restored to its initially high capacity.

Once the minimum cycle length is set, as determined by the physical limitations in carrying out the desorption portion of the cycle, a balance is made between the bed size and the frequency of regenerations wherein the bed is returned to its initial capacity. Thus, the frequency of regenerations has an effect on the quantity of adsorbent required in order to obtain a constant 99.0+ mol percent hydrogen product rate.

Figure 6:
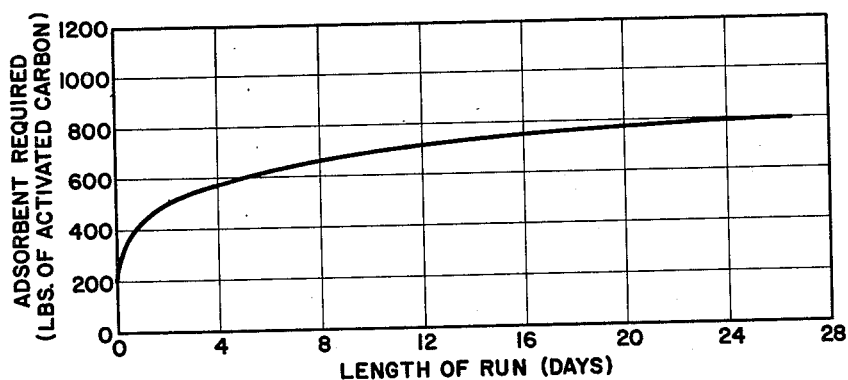
FIGURE 6 illustrates graphically the quantity of adsorbent required as a function of the length of time the adsorbent is used before being regenerated.

FIGURE 6 illustrates how, at a constant hydrogen product rate, the adsorbent requirements increase as the capacity of the adsorbent declines. In FIGURE 6 the adsorbent requirement in pounds is plotted against the length of time the adsorbent is on stream without being regenerated to its initial capacity. The adsorbent requirements shown are those required to yield a constant hydrogen product rate of 3000 standard cubic feet per hour with a feed composition as that shown in Table I.

The means provided by the present invention to restore the capacity of the adsorbent is to purge the adsorbent with an inert gas, such as nitrogen or a gas consisting primarily of nitrogen and $CO_2$. Any gas for which the adsorbent has no particular affinity and which is inert toward the adsorbed hydrocarbon compounds as well as the activated carbon adsorbent is satisfactory.

In the inert gas treat of the adsorbent the more difficultly desorbed components are removed from the adsorbent.

The adsorbent is treated by passing a hot inert gas through the adsorption zones until the temperature of the adsorbent is in the range of from 650 to 750° F.

The mechanism by which the hydrocarbon compounds are removed from the adsorbent seems to be largely a function of the temperature to which the adsorbent is heated. Thus, it is visualized that the inert gas passing through the adsorption zone is a heating medium and serves to heat the adsorbent to the temperature at which the heavy hydrocarbon compounds are removed from the adsorbent.

The data in Table IV illustrate the effect that the temperature to which the adsorbent is heated has on the percent of the hydrocarbon compounds removed from the adsorbent.

TABLE IV

| Absorbent Temperature of— | Cumulative wt. percent Hydrocarbon Removed | |
|---|---|---|
| | After 15 minutes at temperature | After 2 hours at temperature |
| 300 | 11 | |
| 400 | 44 | 34 |
| 500 | 77 | 64 |
| 600 | 88 | 88 |
| 700 | 99 | 100 |

It may be seen from the above data that the effect is predominantly one of temperature rather than one of time and temperature.

The data in Table IV were obtained by heating spent adsorbent using nitrogen as a purge gas. The adsorbent was weighed at each temperature increment to determine the quantity of hydrocarbon driven from the adsorbent.

In the preferred embodiment of the present invention the temperature difference between the inert gas and the adsorbent is initially in the range of from 50 to 350° F. The preferred range is from 150 to 250° F. Thus, when the adsorbent is initially at 100° F., the temperature of the inert gas is in the range of from 250 to 350° F. It has been found that when the relatively cold adsorbent is contacted with a very hot inert gas a permanent capacity loss is experienced. Therefore, it is preferred to limit the temperature difference between the inert gas and the adsorbent.

The upper limit to which the adsorbent is heated is in the range of from 500° to 800° F., preferably in the range of from 650 to 750° F. As a practical matter it is desirable to heat the adsorbent and thus regenerate it as quickly as possible. Since it is preferred to limit the temperature difference between the inert gas flowing into the adsorption zone and the adsorbent, the only way in which the heating rate can be varied is by adjusting the inert gas rate into the adsorption zone. As the data in Table IV show, the effect is more one of temperature alone than it is of time at a given temperature. Therefore, the time it takes to heat the adsorbent to the temperature at which substantially all of the hydrocarbon is removed from the adsorbent is not critical.

Also, it is to be noted that the pressure of regeneration is not critical. The pressure, however, does affect the volume of the gas at a given mass rate. This in turn would affect the pressure drop through the adsorption zone. It is undesirable to have too high a pressure drop across the adsorption zone which results in adsorbent attrition.

In the preferred embodiment of the present invention the adsorbent is heated to a temperature in the range of from 500 to 800° F., preferably in the range of from 650 to 750° F. It is held at this temperature by circulating hot inert gas through the adsorption zone for a period of time sufficient to drive substantially all the hydrocarbon compounds from the adsorbent. The main reason for holding the adsorbent at the upper temperature level is to make sure that substantially all of the adsorbent has been brought up to the desired temperature level. Holding the adsorbent at the upper temperature level for a period of time ranging from 5 minutes to 2 hours is sufficient to insure substantially complete removal of hydrocarbon compounds from the adsorbent.

In the preferred embodiment of the present invention a relatively dry inert gas is used to regenerate the adsorbent. While it is not absolutely essential, it is preferred to use a relatively dry gas since the hydrogen product is used to insure a dry reactor section in the catalytic reforming unit. If, however, water is introduced into the adsorption zone during the inert gas regeneration, it can be removed by cooling the adsorbent down to adsorption temperature with a relatively dry gas.

At the regeneration temperatures involved the adsorption characteristics are such that there is little danger that the adsorbent will adsorb an appreciable amount of water. However, during the cooling period, it is preferred that the quantity of water introduced into the adsorption zones be kept at a minimum.

The adsorbent is cooled from the regeneration temperature to the adsorption temperature by any suitable means. A relatively dry circulating gas is preferred. The adsorbent is cooled as rapidly as possible since there are no effects, either good or bad, associated with rapid cooling, as opposed to slow cooling of the adsorbent.

After the adsorbent has been cooled to the adsorption temperature the adsorption zones are repressured with hydrogen product and feed is introduced to the unit.

There are several factors that enter into the determination as to when the adsorption zones are regenerated with inert gas.

First of all, it may be noted that as the capacity of the adsorbent declines the feed rate on an hourly basis must be increased to obtain a substantially constant hydrogen product rate on an hourly basis. In this description, flow rates are on an hourly basis as opposed to a per cycle basis. Since the cycle length varies with the capacity of the adsorbent, a flow rate on a per cycle basis often gives a confusing picture of what is actually occurring within the hydrogen purification unit.

The reason the feed rate is increased as the capacity of the adsorbent declines is because the cycle length becomes shorter and the adsorption zones are purged with product more frequently in a given period of time. Thus, the hydrogen recovery from the feed decreases and the feed rate must be increased to offset the recovery decline.

Therefore, as the capacity of the adsorbent continues to decline, and the cycle lengths become shorter, the point is eventually reached where the capacity of the adsorbent is so low that hydrocarbon compounds will break through into the hydrogen product stream before the desorption portion of the cycle can be completed on the other adsorption zone. At this point, the hydrogen purification unit is incapable of making a satisfactory product and the adsorbent is then regenerated.

It is to be noted that while the above is the limiting consideration, the adsorption zones can be regenerated more frequently to keep the hydrogen recovery at a high level.

Returning once more to FIGURE 2, the hot inert gas stream is introduced through line 57 and passes into line 58. If zone 30 is being regenerated, the inert gas stream passes through line 32 to zone 30, through lines 28 and 60 and out through line 59 where it may be disposed of in any suitable manner. The effluent from line 59 could be reheated by any suitable means and recycled through zone 30 until the capacity of the adsorbent is restored. Zone 31 is regenerated in a similar manner with the inert gas stream passing through lines 57, 58, 33 to zone 31 and out through line 29, line 60 and line 59. As thus depicted, zones 30 and 31 are regenerated with the inert gas passing downflow through the adsorbent beds. However, it is within the scope of the invention to regenerate the adsorbent beds with inert gas passing upflow. Upflow being the same direction the feed stream is passed through zones 30 and 31. It should also be noted that zones 30 and 31 can be regenerated either one at a time or simultaneously. Also, while it has not been stated previously, the valves in the feed and product effluent lines should be closed so as to allow the inert regeneration gases to flow in the manner described.

A typical example of the operation of the hydrogen purification unit of the present invention is set out as follows:

The make gas feed stream having the composition as that in Table I is sent to the hydrogen purification unit at an initial rate of 12,000 s.c.f./hr., and increasing to 17,500 s.c.f./hr. just prior to regeneration of the adsorbent. This increasing feed rate allows a constant product rate as the adsorbent loses capacity. The conditions employed during adsorption are a temperature of 100° F. and a pressure of 550 p.s.i.g. The ratio of the volume of purge to the volume of feed is 1.0. The desorption pressure is 10.0 p.s.i.a., and the adsorbent employed is National Carbon Company 12/28 mesh HCC grade activated charcoal. Each adsorption zone contains 530 pounds of adsorbent.

At these conditions a product stream of 99.9+ mol percent hydrogen is obtained at a rate of 2900 s.c.f./hr. In the initial operation of the hydrogen purification unit each adsorbent zone is switched from adsorption to desorption every 15 minutes with the necessary valve manipulations being controlled by a variable cycle timer. As the capacity of the adsorbent decreases, the amount of time each zone is on adsorption is also decreased until a 3 minute adsorption period is reached. At this time, the adsorbent in each zone is regenerated with the high temperature inert gas treat. The inert gas regeneration occurs every 30 days. Thus, the adsorbent is returned to its initial capacity every 30 days. The regeneration is effected with a relatively dry, oxygen free inert gas at a temperature about 200° F. above that of the adsorbent. The inert gas is passed through the adsorption zones until the adsorbent beds are heated to a temperature of 700° F. for 15 to 30 minutes. The beds are then cooled with hydrogen product from storage to the adsorption temperature.

While one zone is on adsorption, the other is on desorption. The desorption portion of the cycle is carried out in the steps of depressuring, purging and repressuring the adsorbent bed.

In depressuring, the flow is restricted for about 10 seconds until the pressure of the adsorption zone is about 275 p.s.i.g., and thereafter relatively unrestricted for the next 30 seconds. The desorbate is sent to the refinery fuel gas system, refinery gas recovery system and to a steam jet ejector, respectively. Thus, the adsorption zone is depressured to 100 p.s.i.g. into the refinery fuel gas system, from 100 to 2 p.s.i.g. to the refinery gas recovery system, and from 2 p.s.i.g. to 10 p.s.i.a. to the steam jet ejector. The adsorption zone is evacuated to 10 p.s.i.a. with a steam jet ejector. When the adsorption zone pressure falls below 10 p.s.i.a., purging commences and is continued for 30 seconds at a rate controlled to yield a purge to feed ratio of 1.0.

Following the purge the bed is repressured slowly at first, for about 40 seconds, until the bed pressure reaches about 280 p.s.i.g. The bed is then repressured to an operating pressure of 550 p.s.i.g. in about 1 minute and 10 seconds. At this point this adsorption zone is ready to be switched on the adsorption portion of the cycle. The switch is made when the first trace of hydrocarbon compounds appear in the hydrogen product effluent. The total time required for desorption is about 3 minutes.

The conditions set out in the above example are meant to be typical only and are not intended to limit the scope of the present invention to the conditions employed therein.

Having described this invention, what is sought to be protected by Letters Patent is set out in the following claims.

What is claimed is:

1. A process for obtaining substantially pure hydrogen from a vapor feed stream comprising hydrogen and a mixture of hydrocarbon compounds having from 1 to 10 carbon atoms, the process utilizing two adsorption zones packed with adsorbent selected from the group consisting of activated charcoal and activated alumina selective for hydrocarbon compounds at the adsorption temperature, the two zones being alternately on the adsorption portion of the cycle and alternately on the desorption portion of the cycle to yield a continuous process wherein the capacity of the adsorbent declines due to the accumulation of the more difficultly desorbable hydrocarbon compounds thereon, the process comprising the steps of flowing the feed stream into the first zone in a positive flow direction at a relatively high adsorption pressure, withdrawing a substantially pure hydrogen stream therefrom, adsorbing hydrocarbon compounds in said first zone, changing the flow of the feed stream into the second zone at said relatively high adsorption pressure at least upon the breakthrough of hydrocarbon compounds into the substantially pure hydrogen stream withdrawn from the first zone, thereby putting the second zone on the adsorption portion of the cycle, desorbing a portion of the hydrocarbon compounds from the adsorbent in the first zone by depressuring said first zone to a relatively low desorption pressure and purging said first zone with said substantially pure hydrogen at said relatively low desorption pressure in a flow direction opposite to that of said feed stream with a volume of purge of from 0.5 to 1.5 times the volume of feed passed into said first zone during the adsorption portion of the cycle, repressuring said first zone to substantially said relatively high adsorption pressure with said substantially pure hydrogen, continuing the process in a cyclic manner to obtain a continuous flow of said substantially pure hydrogen product even with a gradual loss in capacity of said adsorbent by employing a variable cycle length wherein the feed rate increases inversely to overcome hydrogen recovery decrease and the cycle length gradually decreases until it reaches the minimum time necessary for desorption, regenerating the adsorbent in said zones at least when capacity of the adsorbent declines to the extent that hydrocarbon compounds break through into the substantially pure hydrogen stream withdrawn from the zone on the adsorption portion of the cycle before the desorption portion of the cycle can be completed on the other zone by flowing an inert gas through the zones to heat the adsorbent to a temperature of at least 600° F., cooling the adsorption zones to substantially the adsorption temperature and continuing the process by flowing the feed stream into one of the adsorption zones.

2. The process of claim 1 wherein said substantially pure hydrogen is 99.0+ mol percent hydrogen.

3. The process of claim 1 wherein said relatively high adsorption pressure is in the range of from 200 to 650 p.s.i.g.

4. The process of claim 1 wherein said relatively low desorption pressure is in the range of from 8 to 12 p.s.i.a.

5. The process of claim 1 wherein said adsorption temperature is in the range of from 75 to 150° F.

6. The process of claim 1 wherein the vapor emanating from the zone being depressured is recovered by flowing the vapor to a fuel gas system until the pressure in the zone reaches about 2 p.s.i.g.

7. The process of claim 1 wherein the time required for the desorption portion of the cycle is about 3 minutes and the adsorbent is regenerated about every 30 days.

8. A process for obtaining 99.0+ mol percent hydrogen at a substantially constant rate from a vapor feed stream comprising hydrogen and a mixture of hydrocarbon compounds having from 1 to 10 carbon atoms, the process utilizing two adsorption zones packed with adsorbent selected from the group consisting of activated charcoal and alumina selective for hydrocarbon compounds, the two zones being alternately on the adsorption porton of the cycle and alternately on the desorption portion of the cycle to yield a continuous process wherein the capacity of the adsorbent declines due to the accumulation of the more difficultly desorbable hydrocarbon compounds thereon, the process comprising the steps of flowing the feed stream into the first zone in a positive flow direction at a temperature in the range of from 75 to 150° F. and at a pressure in the range of from 200 to 650 p.s.i.g., withdrawing a 99.0+ mol percent hydrogen stream therefrom, adsorbing hydrocarbon compounds in said first zone, changing the flow of the feed stream into the second zone at a temperature in the range of from 75 to 150° F. and at a pressure in the range of from 200 to 650 p.s.i.g. at least upon the breakthrough of hydrocarbon compounds into the 99.0+ mol percent hydrogen stream withdrawn from the first zone thereby putting the second zone on the adsorption portion of the cycle, partially desorbing the hydrocarbon compounds from the adsorbent in the first zone by depressuring said first zone to a pressure in the range of from 8 to 12 p.s.i.a. and purging said first zone with said 99.0+ mol percent hydrogen at a pressure in the range of from 8 to 12 p.s.i.a. in a flow direction opposite to that of said feed stream with a volume of purge of from 0.8 to 1.2 times the volume of feed passed into said first zone during the adsorption portion of the cycle, continuing the process in a cyclic manner to obtain continuous flow of said substantially pure hydrogen product even with a gradual loss in the capacity of said adsorbent by employing a variable cycle length wherein the feed rate increases inversely to compensate for the hydrogen recovery decrease and the cycle length gradually decreases until it reaches the minimum time necessary for desorption, regenerating the adsorbent in said zones at least when the capacity of the adsorbent declines to the extent that hydrocarbon compounds break through into the substantially pure hydrogen stream withdrawn from the zone on the adsorption portion of the cycle before the desorption portion of the cycle can be completed on the other zone by flowing an inert gas through the zones to heat the adsorbent to a temperature in the range of from 600 to 750° F., cooling said zones to a temperature in the range of from 75 to 150° F. and continuing the process by flowing the feed stream into the first zone.

9. The process of claim 8 wherein the vapor emanating from the zone being depressured is recovered by flowing the vapor to a fuel gas system until the pressure in the zone reaches about 2 p.s.i.g.

10. The process of claim 8 wherein the time required for the desorption portion of the cycle is about 3 minutes and the adsorbent is regenerated about every 30 days.

11. A process according to claim 1 wherein said zones are first depressured to an intermediate low pressure followed by depressuring to the lowest pressure of said cycle thereby avoiding adsorbent attrition.

12. A process according to claim 8 wherein said zones are first depressured to an intermediate low pressure followed by depressuring to the lowest pressure of said cycle thereby avoiding adsorbent attrition.

References Cited in the file of this patent

UNITED STATES PATENTS

| | | |
|---|---|---|
| 2,920,037 | Haensel | Jan. 5, 1960 |
| 2,935,459 | Hess et al. | May 3, 1960 |
| 2,956,015 | Hann | Oct. 11, 1960 |
| 2,983,668 | Hemminger | May 9, 1961 |
| 3,024,868 | Milton | Mar. 13, 1962 |
| 3,086,339 | Skarstrom et al. | Apr. 23, 1963 |
| 3,101,261 | Skarstrom | Aug. 20, 1963 |
| 3,104,162 | Skarstrom | Sept. 17, 1963 |